(12) United States Patent
Harting et al.

(10) Patent No.: US 11,117,437 B2
(45) Date of Patent: Sep. 14, 2021

(54) SUSPENSION DEVICE FOR A WHEELED VEHICLE

(71) Applicant: Continental Teves AG & Co. OHG, Frankfurt am Main (DE)

(72) Inventors: Hans-Joachim Harting, Hannover (DE); Jens-Uwe Gleu, Langenhagen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/892,530

(22) Filed: Jun. 4, 2020

(65) Prior Publication Data

US 2020/0290425 A1  Sep. 17, 2020

Related U.S. Application Data

(63) Continuation of application No. PCT/EP2018/081230, filed on Nov. 14, 2018.

(30) Foreign Application Priority Data

Dec. 8, 2017 (DE) ...................... 10 2017 222 278.6

(51) Int. Cl.
*B60G 21/06* (2006.01)
*B60G 17/052* (2006.01)

(52) U.S. Cl.
CPC ......... *B60G 21/06* (2013.01); *B60G 17/0525* (2013.01); *B60G 17/0528* (2013.01);
(Continued)

(58) Field of Classification Search
CPC ............... B60G 21/06; B60G 17/0525; B60G 17/0528; B60G 17/0565; B60G 2500/2014; B60G 2500/2021; B60G 2500/205
(Continued)

(56) References Cited

U.S. PATENT DOCUMENTS 3,059,918 A * 10/1962 Pribonic ............ B60G 17/0523
 267/64.16
4,624,476 A * 11/1986 Tanaka ................. B60G 17/016
 280/5.51
(Continued)

FOREIGN PATENT DOCUMENTS

DE           3502334 C2     7/1985
DE     102005028328 A1    12/2006
(Continued)

OTHER PUBLICATIONS

Search Report dated Aug. 3, 2018 from corresponding German Patent Application No. DE 10 2017 222 278.6.
(Continued)

*Primary Examiner* — Ruth Ilan
*Assistant Examiner* — Caitlin Anne Miller

(57) ABSTRACT

A suspension device for a wheeled vehicle with a plurality of air springs is described. Two main air chambers of two air springs of a respective vehicle axle are connected together via a transverse air chamber which forms an intermediate volume. A compressor arranged between the two transverse air chambers is connected to the first transverse air chamber via a first connecting line in which a first switchable valve is arranged, and to the second transverse air chamber via a second connecting line in which a second switchable valve is arranged, so that direct filling/direct evacuation of the intermediate volumes of the two transverse air chambers is possible.

10 Claims, 2 Drawing Sheets

(52) U.S. Cl.
CPC .. *B60G 2500/202* (2013.01); *B60G 2500/205* (2013.01); *B60G 2500/2014* (2013.01); *B60G 2500/302* (2013.01)

(58) Field of Classification Search
USPC ..................................... 280/124.16, 124.161
See application file for complete search history.

(56) References Cited

U.S. PATENT DOCUMENTS

| | | | |
|---|---|---|---|
| 4,796,911 A | 1/1989 | Kuroki et al. | |
| 5,144,559 A | 9/1992 | Kamimura et al. | |
| 5,765,115 A | 6/1998 | Ivan | |
| 6,688,612 B1 | 2/2004 | Burdock et al. | |
| 7,040,632 B2* | 5/2006 | Burdock | B60G 17/0155 |
| | | | 280/124.157 |
| 7,644,933 B2* | 1/2010 | Brookes | B60G 17/0523 |
| | | | 280/5.502 |
| 10,682,894 B2* | 6/2020 | Ito | B60G 17/015 |
| 10,967,697 B2* | 4/2021 | Yoshida | B60G 17/052 |
| 2017/0341480 A1* | 11/2017 | Oishi | B60G 11/27 |
| 2019/0039431 A1* | 2/2019 | Vaughan | B60G 21/026 |
| 2019/0359025 A1* | 11/2019 | Wager | B60G 21/073 |

FOREIGN PATENT DOCUMENTS

| | | |
|---|---|---|
| DE | 102007060102 A1 | 6/2009 |
| EP | 1101637 B1 | 2/2008 |
| GB | 2155207 A | 9/1985 |
| GB | 2440023 B | 1/2008 |

OTHER PUBLICATIONS

International Search Report and Written Opinion dated Feb. 26, 2019 from corresponding International Patent Application No. PCT/EP2018/081230.

* cited by examiner

SUSPENSION DEVICE FOR A WHEELED VEHICLE

CROSS REFERENCE TO RELATED APPLICATIONS

This application claims priority to PCT International Application No. PCT/EP2018/081230, filed Nov. 14, 2018, which claims priority to German Patent Application No. DE 2017 222 278.6, filed Dec. 8, 2017, wherein the contents of such applications are incorporated herein by reference.

TECHNICAL FIELD

A suspension device for a wheeled vehicle with a plurality of air springs.

TECHNICAL BACKGROUND

DE 35 02 334 C2 describes a suspension system in which the wheel-side air springs of a respective axle are connected together by a volume, wherein this connection can be separated by wheel-side switching valves. In the solution described however, the storage volume of the axles is inseparably connected to the compressor by a common filling line. Thus it is impossible, by means of the connection shown, to generate pressure differences at the transverse storage volume using the compressor.

This gives restricted possibilities for adjustment for the entire suspension system.

DE 10 2007 060 102 A1 discloses a similarly constructed suspension device for a wheeled vehicle. In a special embodiment described in this publication, additional air chambers are provided between two air springs of a respective axle and connected together via a connecting line in which switchable valves are arranged. Furthermore, an additional air chamber is connected to a compressor. When the compressor is actuated, therefore, independent pressurization of the two additional air chambers with compressed air is not possible, so that here too, the possibilities for adjustment of the suspension device are restricted.

What is needed is an improved suspension device.

DETAILED DESCRIPTION OF THE EMBODIMENTS

Figure 1:
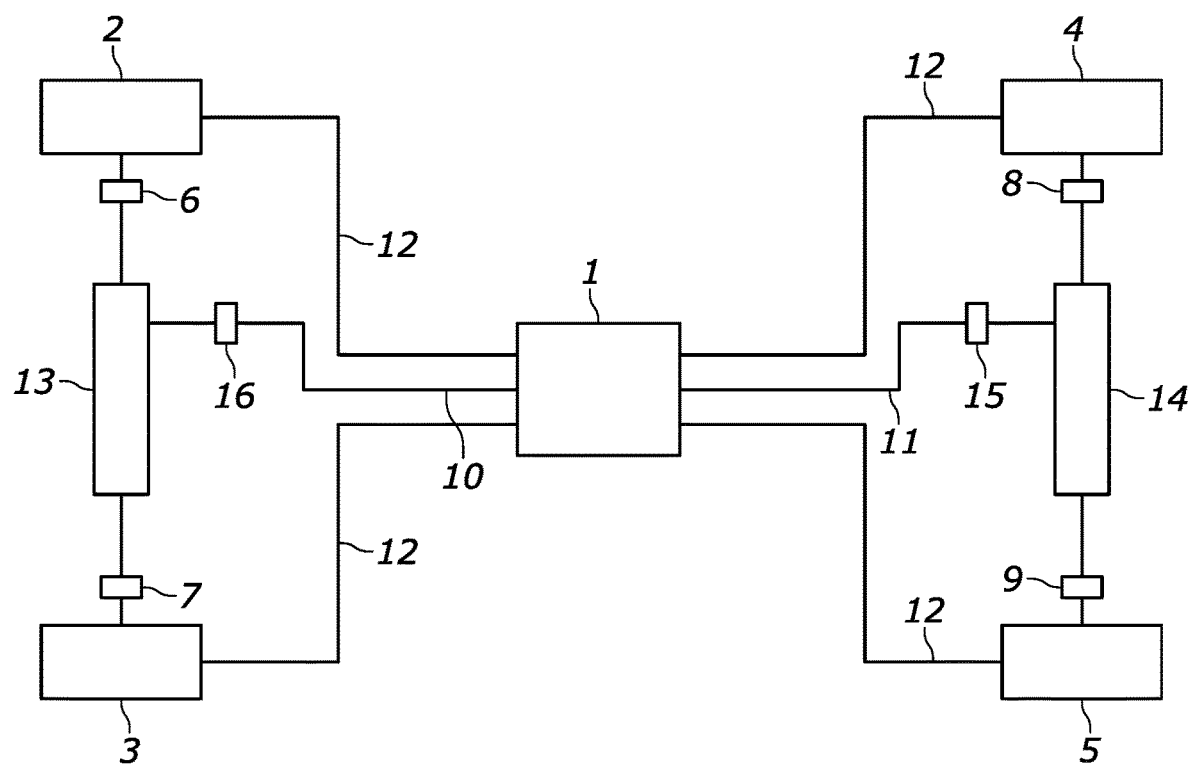
FIG. 1 a schematic illustration of a basic principle of a suspension device.

FIG. 1 shows the basic structure of a suspension device. The suspension device has as a compressed air source a compressor 1 which is connected to main air chambers 2, 3, 4, 5 of air springs via four lines 12. The corresponding air springs are each arranged on a wheel suspension of an assigned vehicle wheel, wherein the two main air chambers 2, 3 belong to the air springs on the front axle, and the two main air chambers 4, 5 belong to the air springs of the rear axle of the corresponding vehicle.

A transverse air chamber 13, which is configured as a storage volume (intermediate volume) and connected to the two main air chambers 2, 3 via corresponding lines, is arranged between the two main air chambers 2, 3 of the front axle. A control valve 6, 7, which can open and close the connection between the main air chamber and the transverse air chamber, is situated between each of the main air chambers 2, 3 and the transverse air chamber 13.

A corresponding structure is arranged on the rear axle. Here, a second transverse air chamber 14 is provided between the two main air chambers 4, 5 and connected to the main air chambers 4, 5 via corresponding air lines, wherein corresponding control valves 8, 9 open or close the air lines.

The two transverse air chambers 13, 14 (intermediate volumes) may thus be connected optionally to an air spring of the right or left vehicle side, or to both air springs or to neither air spring. This gives the advantages already described above.

Furthermore, the compressor 1 is connected to the first transverse air chamber 13 via a first connecting line 10, and to the second transverse chamber 14 by a second connecting line 11. A first switchable valve 16 is arranged in the first connecting line 10, while a second switchable valve 15 is arranged in the second connecting line 11. This allows direct filling/direct evacuation of the two transverse air chambers 13, 14 independently of each other. Therefore either the transverse air chamber 13 or the transverse chamber 14, or both transverse air chambers 13, 14 jointly or neither of the transverse air chambers, may be filled or evacuated so that it is possible to build up different pressure levels in the two transverse air chambers 13, 14.

When a closed-loop air supply is used which is characterized in that the compressor, in one operating mode, can draw in technically tightly separated air exclusively from a channel or accumulator isolated from the environment instead of drawing this in from the environment, amongst others advantageously it is possible to repump air from the transverse air chambers (intermediate volumes) into corresponding air springs or vice versa. This allows the pressures to vary between the air springs of the axle and the associated intermediate volumes.

Further advantages of this solution have already been described above and below.

Figure 2:
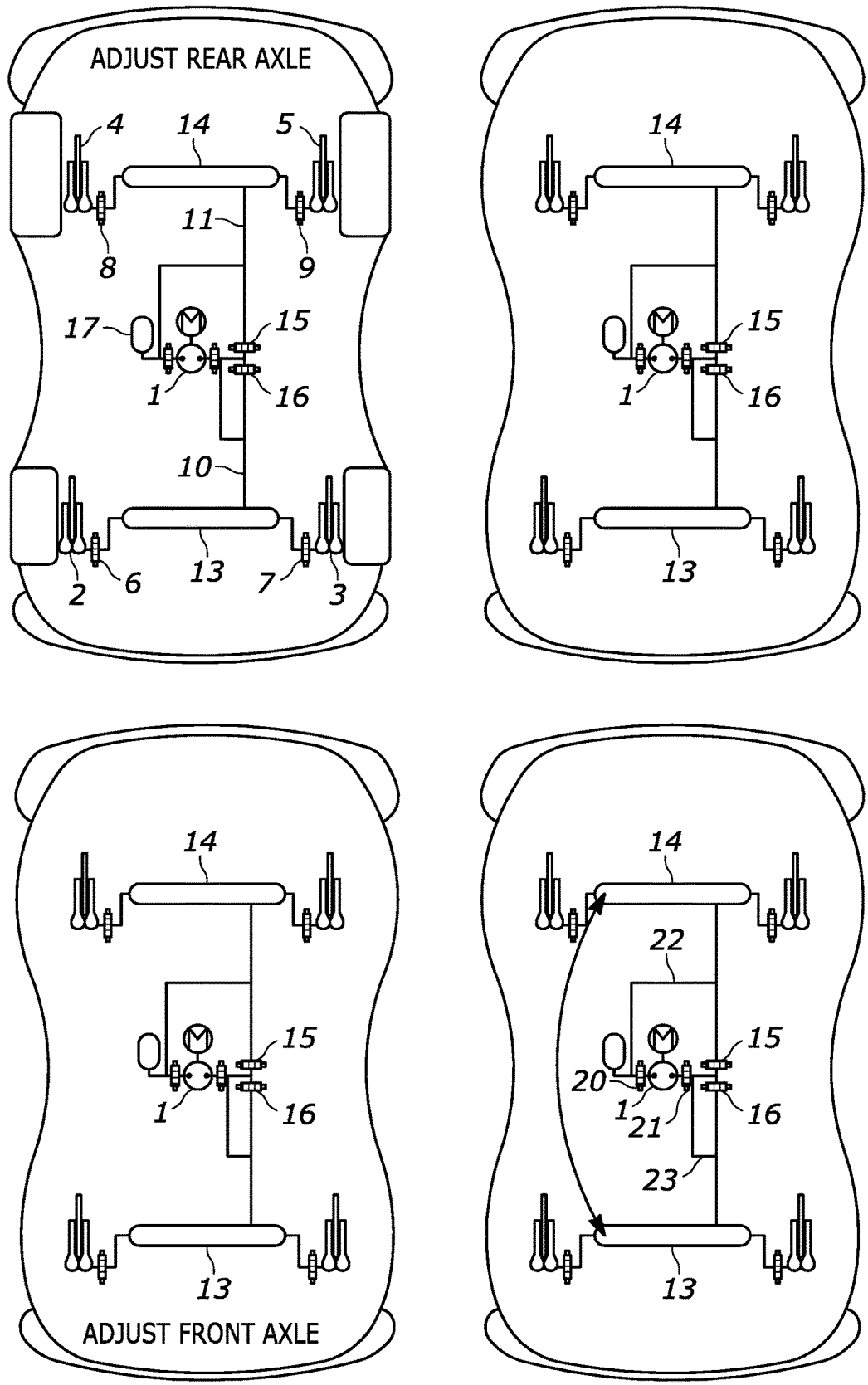
FIG. 2 an embodiment of a suspension device in four different function stages.

FIG. 2 shows a further embodiment of a suspension device in four stages. The diagram at the top left concerns the adjustment of the rear axle arranged at the top in the figure, the middle diagram at the top shows a neutral state, the diagram at the top right shows the adjustment of the front axle shown at the bottom in the figure, and the lower diagram shows the creation of a pressure difference between the two transverse chambers 13 and 14.

The two transverse air chambers 13, 14 of the front axle and the rear axle are connected to the main air chambers 2, 3 and 4, 5 of the respective air springs via corresponding air lines, wherein corresponding control valves 6, 7 and 8, 9 are provided in between. A compressor 1 arranged centrally between the two transverse air chambers 13, 14 is connected to the corresponding transverse air chambers 13, 14 via a first connecting line 10 and a second connecting line 11 respectively. The first connecting line 10 contains a switchable valve 16, and the second connecting line 11 contains a switchable valve 15. A storage tank 17 is assigned to the compressor 1.

The diagram at the top left shows the process of adjusting the rear axle which is shown at the top in the figure. The two control valves 8, 9 are here opened so that air can be exchanged between the main air chambers 4, 5 and the transverse chamber 14. The compressor 1 is connected to the transverse air chamber 14 by the first connecting line 11 when the valve 15 is opened. The corresponding valves of the front axle are here closed.

The diagram at the top right shows the process of adjusting the front axle which is shown at the bottom in the figure. Here, the valves 16, 6 and 7 are open while the corresponding valves of the rear axle are closed.

The middle diagram at the top shows a neutral state in which all relevant valves are closed.

The lower diagram of FIG. 2 shows the creation of a pressure difference between the two transverse air chambers 13 and 14. Here, valves 15, 16 and all control valves 6, 7 and 8, 9 are closed, while two valves 20, 21 arranged adjacent to the compressor 1 are opened. The transverse chambers 13, 14 are pressurized via corresponding bypass lines 22, 23, wherein a corresponding pressure difference is created when one of the valves 20, 21 is closed.

According to the embodiments, a suspension device of the type indicated in that the compressor arranged between the two transverse air chambers is connected to the first transverse air chamber via a first connecting line in which a first switchable valve is arranged, and to the second transverse air chamber via a second connecting line in which a second switchable valve is arranged.

The design according to the embodiments allows the compressor to be able to pump directly into the respective transverse air chamber, and in this way the two transverse air chambers can be pressurized independently of each other, so that in this fashion different pressure levels may be built up in the transverse air chambers of the front axle or rear axle respectively. If required, desired compensation actions may thereby be taken. Thus for example in the case of danger, the front axle can be rapidly raised using the pressure from the rear axle. The possibility of creating different pressure levels in the transverse air chambers of the two axles therefore offers a plurality of further adjustment possibilities which will be discussed below.

With a suspension device configured according to the embodiments, a transverse air chamber (intermediate volume) is assigned to each vehicle axle. This transverse air chamber is connected to the main air chambers of the air springs, which are each arranged on a wheel suspension of an assigned vehicle wheel, either directly or via a corresponding compressed air line. A control valve is arranged between the transverse air chamber and the respective main chamber, via which valve the corresponding connection can be closed off or opened. The arrangement of such control valves (transverse blocks) is known.

With the solution according to the embodiments, by the parallel use of corresponding control valves (transverse blocks) and switchable additional volumes (transverse air chambers), it is possible to influence the springing, rolling and pitching behavior, whereby only two additional volumes are used in the form of the transverse air chambers. With the design according to the embodiments, the additional volume provided by the transverse air chambers may be connected to the air spring on either the right or the left vehicle side, or to both or to neither of the two air springs on the axle side.

According to the embodiments, the transverse air chambers (intermediate volumes) are connected to the vehicle air supply such that direct filling/direct evacuation of the intermediate volumes is possible. This advantageously allows, inter alia, the repumping of air from the intermediate volume into the air springs of the vehicle corner or vice versa. This allows the pressures to vary between the air springs of the axle and the associated intermediate volume.

The useful preselection of a pressure level in the intermediate volume relative to the actual volume of the air springs creates the possibility of a particularly effective and rapid raising and lowering of the vehicle. The time of a desired ride height adjustment can be separated from a delivery activity of the compressor by the described arrangement of the air lines and valves between the compressor and the transverse volume. Thus at times when no ride height adjustment is required and the main volumes of the air springs are shut off, the compressor may be used to build up pressures in the transverse volumes which deviate towards the positive or negative from the pressures of the main volumes of the air springs. This delivery activity may take place with low compressor performance, and the energy stored as pressure differences can be generated and stored over an extended period.

If then suddenly the intermediate volume is reconnected to the actual volumes of the air springs by opening of the control valve at the air spring, the air overflows from the transverse volume into the main volume of the air spring and vice versa, and the respective vehicle axle or corner is lowered or raised particularly rapidly. This possibility allows an extremely fast ride height adjustment because this takes place without a compressor, by simple overflow of air quantities from the actual volumes of the air springs into the intermediate volume or vice versa.

The transverse air chamber arranged between the two vehicle sides constitutes a corresponding air storage volume, and is connected on both sides to the two air springs of the vehicle axle directly or via corresponding connecting lines, wherein a control valve (switching valve) is arranged between each main air chamber and the transverse air chamber and can be actuated to create or interrupt the corresponding connection. The transverse air chamber may thus be connected optionally to an air spring of the right or left vehicle side, or to both air springs or to neither air spring.

The transverse air chamber (intermediate volume or transverse volume) is thus used as an element of a transverse block, whereby the entire springing behaviour of the associated axle becomes more comfortable.

In a refinement of the suspension device configured according to the embodiments, this has a storage container assigned to the compressor, and in an embodiment it is configured as a closed-loop ride height adjustment system. Here, with a closed-loop system, air can easily be transferred from one transverse volume into the other in order to build up pressure.

One embodiment is distinguished in that the first and second connecting lines comprise a line connecting the first and second transverse air chambers, said line containing the two switchable valves, and the line coming from the compressor opens between said valves. By switching the two valves, the compressor may load either the one transverse air chamber or the other transverse chamber, or both transverse air chambers simultaneously or neither transverse air chamber.

The control valves or switchable valves used are digital valves (two-way valves) with which corresponding lines can be opened or closed.

The invention claimed is:

1. A suspension device for a wheeled vehicle with a plurality of air springs, each air spring of the plurality of air springs is arranged on a wheel suspension of an assigned vehicle wheel and comprises a main air chamber, wherein main air chambers of two air springs of the plurality of air springs of a respective axle are configured, via an assigned control valve, to be connected to and separated from a common transverse air chamber arranged in between, the suspension device comprising:

a compressor with a filling valve and an outlet valve connected to the environment;

a first connecting line in which a first switchable valve is arranged, and a second connecting line which a second switchable valve is arranged, wherein the compressor is arranged between two common transverse air chambers and the compressor is connected to a first transverse air chamber of the two common transverse air chambers via the first connecting line and to a second common transverse air chamber of the two common transverse air chambers via the second connecting line.

2. The suspension device as claimed in claim 1, further comprising a storage tank assigned to the compressor.

3. The suspension device as claimed in claim 1, wherein the suspension device is configured as a closed-loop ride-height adjustment system.

4. The suspension device as claimed in claim 2, wherein the suspension device is configured as a closed-loop ride-height adjustment system.

5. The suspension device as claimed in claim 1, wherein the first connecting line and the second connecting line comprise a line connecting the first common transverse air chamber and the second common transverse air chamber, the line containing the first switchable valve and the second switchable valve, and the line coming from the compressor opens between the first switchable valve and the second switchable valve.

6. The suspension device as claimed in claim 2, wherein the first connecting line and the second connecting line comprise a line connecting the first common transverse air chamber and the second common transverse air chamber, the line containing the first switchable valve and the second switchable valve, and the line coming from the compressor opens between the first switchable valve and the second switchable valve.

7. The suspension device as claimed in claim 3, wherein the first connecting line and the second connecting line comprise a line connecting the first common transverse air chamber and the second common transverse air chamber, the line containing the first switchable valve and the second switchable valve, and the line coming from the compressor opens between the first switchable valve and the second switchable valve.

8. The suspension device as claimed in claim 5, further comprising:
a first bypass line provided for the first switchable valve; and
a second bypass line provided for the second switchable valve.

9. The suspension device as claimed in claim 6, further comprising:
a first bypass line provided for the first switchable valve; and
a second bypass line provided for the second switchable valve.

10. The suspension device as claimed in claim 7, further comprising:
a first bypass line provided for the first switchable valve, and
a second bypass line provided for the second switchable valve.

* * * * *